Aug. 28, 1962   J. E. FLANAGAN   3,051,505
ATTACHMENT OF GOLF BAG TO CART
Filed March 21, 1960
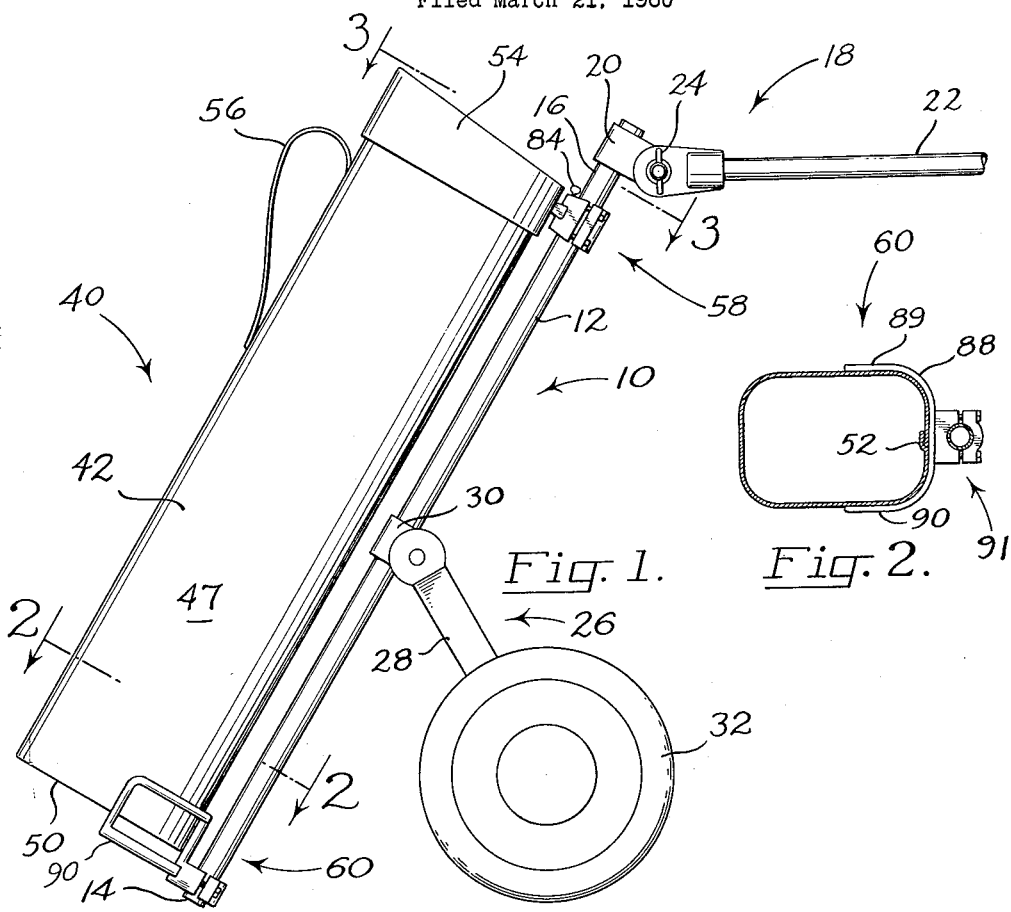
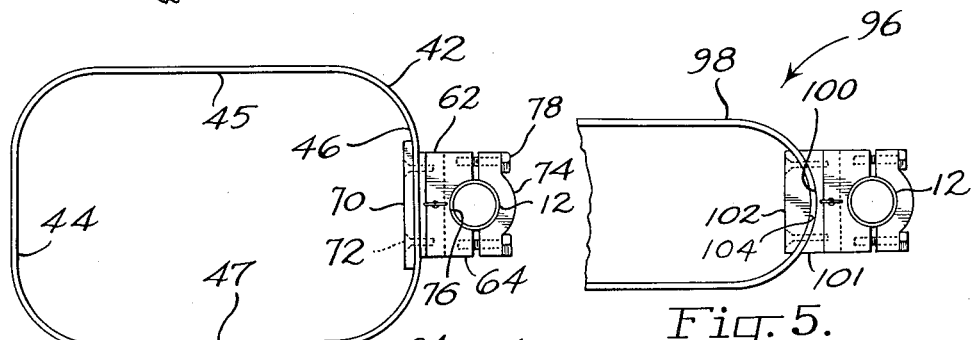
James E. Flanagan
INVENTOR.
BY Ramsey and Kolisch
Attys.

United States Patent Office 3,051,505
Patented Aug. 28, 1962

3,051,505
ATTACHMENT OF GOLF BAG TO CART
James E. Flanagan, 1119 SE. 146th Ave., Portland, Oreg.
Filed Mar. 21, 1960, Ser. No. 16,539
4 Claims. (Cl. 280—47.26)

This invention relates to golf carts and bags, and more particularly to mechanism connecting the golf bag and golf cart whereby the golf bag is securely held on the cart, but may easily be removed from the cart, for such purposes as to enable a golfer himself, or his caddy, to tote the bag.

Golf carts are popular with golfers for obvious reasons. Generally golf carts take the form of an elongated, substantially upright, wheel-supported frame, and a golf bag is secured to such frame to enable the latter to carry the former while rolling over the ground. It is desirable that mechanism connecting the bag and cart hold the bag firmly, but at the same time enable easy separation of the bag from the cart.

It is a general object of this invention to provide an improved construction for connecting a golf bag to a cart, which takes care of the above indicated requirements in a practical and highly satisfactory manner.

A more specific object of the invention is to provide improved mechanism connecting a bag and cart wherein the golf bag is supported on the cart in such a manner as to be securely braced from twisting and turning relative to the cart frame.

A further object is to provide improved mechanism attaching a golf bag to a cart wherein the side walls of a golf bag are kept taut, and thus prevented from bunching up thereby to make the removal of clubs from the bag difficult.

The attachment mechanism of the invention is easily installed on a golf cart and bag, and when installed, it detracts substantially nothing from the utility of the bag without the cart. Further, the mechanism is neat and sightly in appearance, with the bag attached to a cart or removed therefrom. With the bag separated from the cart, the mechanism is devoid of loose dangling ends, or large protuberances that could catch and rip clothing.

Other objects, features, and advantages of the invention will become more apparant as the following description is read in conjunction with the accompanying drawings, wherein:

FIG. 1 is a side view of a golf cart and bag, illustrating one embodiment of the invention;

FIG. 2 is a section view along the line 2—2 in FIG. 1, illustrating how the bottom of the bag may be supported on the cart;

FIG. 3 is a view, somewhat enlarged, along the line 3—3 in FIG. 1, showing in plan a detachable fastening contemplated by the invention securing the top end of the golf bag to a cart;

FIG. 4 is a side view of the detachable fastening illustrated in FIG. 3; and

FIG. 5 is a view similar to FIG. 3 but illustrating another modification of the invention.

Considering first the embodiment of the invention illustrated in FIGS. 1–4, 10 indicates generally a golf cart, in most particulars rather conventional in construction. Thus, as is typical of many golf carts, the cart includes an upright, elongated tube frame 12, with a bottom end 14 that in use is adapted to be rested on the ground when the cart is stationary. Top end 16 of frame 12 is provided with a handle mechanism 18 extending forwardly of the frame. This handle mechanism may include a part 20 made fast to the top end of the frame, and an elongated handle 22 secured to part 20 by wing-nut and bolt assembly 24. Adjustment in the position of handle 22 relative to frame 12 is possible since the handle is pivotable relative to part 20 about the axis of the wing-nut and bolt assembly with the wing nut loosened.

Intermediate the ends of the tube frame is a wheel mounting 26 which may take the form of a pair of diverging legs 28 (one of which is obscured in FIG. 1) fastened by fitting 30 to the tube frame. Rotatably mounted on the ends of the legs 28 are lateral support wheels 32 (one being obscured in FIG. 1). With the cart in the position shown in FIG. 1 (a stationary position), the two lateral support wheels and bottom end 14 of the frame provide a three-point support for the cart. The wheels make the frame a wheel-supported frame.

Mounted on cart 10 toward the rear of the frame for the cart is a golf bag, indicated generally at 40. In the embodiment illustrated, the bag comprises a conventional hollow body 42, defined by side walls 44, 45, 46, and 47 closing the bottom end of the bag is a bottom 50. The side walls of the bag ordinarily are made of somewhat flexible material (cloth etc.), often one continuous piece joined along one of the side walls as by hem 52. Around the top of the bag is a reinforcing band 54 giving shape to the bag, and ordinarily made of leather, plastic, heavy fabric, and the like. Fastened to one of the side walls is a handle 56.

According to this invention, the bag is supported on cart 10 by means securing the top end of the bag to the cart, indicated generally at 58, and means holding the bottom end in place, indicated at 60.

Considering first mechanism 58, and now referring more particularly to FIGS. 3 and 4, this comprises a pair of locking members or portions indicated at 62 and 64. These are separable from each other, but in the interengaged position shown in FIGS. 3 and 4, the members are held securely from relative horizontal and vertical movement. One of the locking members or portions is secured to the bag at the location of reinforcing band 54, and the other of the members to the tube frame 12. The connection is such that the bag is held on the frame in such a manner as to prevent up and down movement or twisting of the bag about a vertical axis relative to the frame.

Thus, on the inside and extending transversely of the bag is a backing member 70. This backing member is disposed oppositely to and is substantially parallel with locking member 62, such extending transversely of the bag on its outside. Thus, locking member 62 also constitutes a backing member in the construction. Members 70, 62 are drawn securely together by fasteners, indicated at 72 and ordinarily taking the form of screws, that extend through the wall of the bag and when tightened firmly draw members 62, 70 together. By employing plural fasteners aligned transversely of the bag, locking member 62 is secured to the bag over an expanse extending transversely of the bag, and skewing of the member relative to the bag about upright axis is prevented.

Continuing, locking member 64 is secured to tube frame 12 by a concavely recessed bracket half, indicated at 74. Member 64 itself is also recessed, at 76, and constitutes another bracket half complementing bracket half 74. The two bracket halves are drawn together about the frame and clamped in fixed position thereon by screws 78.

Along the rear side of locking member 62 is an elongated tenon portion 80 that extends horizontally and transversely of the bag. The front side of locking member 64 is provided with an elongated mortise portion 82 extending horizontally and transversely of the bag complementing tenon portion 80. The tenon portion is slid into the mortise portion by relative horizontal movement. Once the two are slid into place, the two are held from relative vertical movement and twisting about a horizontal transverse axis. The two locking members are secured from relative horizontal movement when in an interengaged position by an adjustable wing screw 84, which has an inner end adapted to seat within an indent 86 provided the tenon portion 80. The tenon and mortise portions have edges paralleling their length that are rounded, to inhibit any fracturing tendencies in the member having the mortise portion.

According to an embodiment of this invention it is contemplated that the bag be supported by means 58 through its reinforcing band, and that the bag depend from its upper connection with the frame. In this way, the side walls of the bag are kept taut by gravity pulling down on the bottom of the bag, and are prevented from bunching up so as to make removal of golf clubs difficult. The means 60 at the bottom of the bag functions primarily to confine the bottom end of the bag from lateral movement. In the embodiment of the invention shown, means 60 comprises a U-shaped cradling means 88 having leg portions 89, 90 extending over opposite sides of the bag. The cradling means is secured to frame 12 by bracket structure 91.

In the modification of the invention illustrated in FIG. 5, a golf bag 96 is present which has an elongated, rather narrow, somewhat oval cross section. Thus the reinforcing band 98 at the top of the bag has substantial curvature at locations above the narrow side walls of the bag. With this type of bag, locking member 101, that takes the place of member 62 in the first embodiment, is provided with a concavely curved rear face, indicated at 100, that fits snugly against the outside of the reinforcing band, and backing member 102 replacing member 70 is provided with a convexly curved face 104 that fits snugly against the inside of the bag. In this construction, as in the first described embodiment, once the parts are securely fastened in place, the bag is prevented from twisting from side to side.

In using the invention, a golf bag is first placed with its bottom end in the cradling means provided at the base of the golf cart. The upper end of the bag is then moved into place by fitting the tenon and mortise portions together, through relative lateral movement. When the tenon portion has its ends substantially aligned with the ends of the mortise portion, indent 86 is located directly under screw 84, and the two portions may be secured together by turning down on screw 84. In this position the bag is ready for transport.

With the bag removed from the cart, the only parts carried by the bag are the locking member 62 and the backing member that complements it. The part carried outside the bag is small and hardly noticeable, and detracts relatively little if anything from the utility of the bag used separately from the cart. It is preferable that the tenon portion be secured to the bag and not to the frame, since it is more easily cleaned should the bag be laid down and pick up dirt, and constitutes less of a possible ripping hazard to clothes, etc.

The construction contemplated by the invention has a number of advantages over constructions known heretofore. While various embodiments of the invention have been described, changes may be made in the parts and/or their arrangement without departing from the invention. It is intended to cover all modifications and variations that would be apparent to one skilled in the art, and that come within the scope of the appended claims.

It is claimed and desired to secure by Letters Patent:

1. In combination with a wheeled golf cart and an elongated golf bag mounted thereon at the rear thereof, said golf cart having an upright frame substantially co-extensive with the length of the bag, means holding the bottom of the bag from lateral shifting relative to said frame, and detachable mechanism securing the top of the bag to said frame and holding the bag dependently on the frame with the bottom of the bag restrained from swinging to the rear of the frame, said mechanism comprising a first locking member secured to the bag over an expanse extending transversely of the bag and held from twisting relative to the bag about an upright axis, a second locking member secured to the frame in fixed position thereon, one of said locking members having a horizontally extending tenon portion and the other of said locking members having an horizontally extending and complementary mortise portion, said mortise and tenon portions being interengageable by relative horizontal movement extending laterally of the bag and having a construction that confines the two portions from relative vertical movement and twisting about a horizontal transverse axis when interengaged, and means for detachably securing said first and second locking members from relative horizontal movement.

2. Mechanism for detachably connecting a golf bag to a cart having an upstanding frame comprising horizontally disposed inside and outside backing members adapted to be placed, one on the inside and one on the outside, against upper portions of the side wall of a golf bag with said backing members shaped snugly to fit against the inside and outside of said wall, plural fasteners uniting the backing members and spaced horizontally therealong and constructed to enable clamping of the backing members tightly against the golf bag with the backing members secured from twisting in all directions relative to the bag, a pair of bracket halves detachably secured together and adapted to be clamped rigidly in place on the upstanding frame of the golf cart, and separable means connecting said bracket halves and the outer backing member, said means comprising an elongated and horizontally disposed mortise and an elongated horizontally disposed tenon received within said mortise, said mortise and tenon having a shape constructed to inhibit relative twisting about a horizontal axis.

3. Mechanism for detachably connecting a golf bag to a cart having an upstanding frame comprising horizontally disposed inside and outside backing members adapted to be placed against upper portions of the side wall of a golf bag, one on the inside and one on the outside of the bag, plural fasteners uniting the backing members and spaced horizontally therealong and constructed to enable clamping of the backing members tightly against the golf bag, a horizontally extending tenon portion provided on the outside backing member, a bracket portion comprising a pair of bracket halves detachably secured together and adapted to be fitted onto and clamped rigidly in place on the upstanding frame of a golf cart, an elongated horizontally disposed mortise portion complementing said tenon portion and detachably receiving the same provided one of said bracket halves, and means for securing said mortise and tenon portions from relative horizontal shifting.

4. In combination with a wheeled golf cart and an elongated golf bag mounted thereon at the rear thereof having a reinforcing collar around the top end of the bag, said golf cart having an upright frame substantially co-extensive with the length of the bag, U-shaped cradling means mounting the bottom end of the bag made rigid with said frame and having leg portions restraining the bottom end from lateral shifting relative to said frame, and detachable mechanism securing the top end of the bag through its reinforcing collar to said frame with the bag dependently supported therefrom and with the bottom end of the bag restrained from swinging to the rear of the frame, said mechanism comprising a pair of opposed backing members disposed transversely of the bag and one on the inside and one on the outside of said reinforcing collar, said backing members being constructed to fit snugly against the inside and outside of said collar, plural fasteners extending through the reinforcing collar and uniting the backing members at locations spaced transversely across the bag while clamping them firmly together against said reinforcing collar, said backing members having a construction that secures them from twisting in all directions relative to said collar, upon their being united by said fasteners a substantially horizontally extending tenon portion integral with the outside backing member, a bracket portion fastened in fixed position on said frame having an elongated mortise portion complementing said tenon portion and detachably receiving the same, said mortise and tenon portions being interengageable by relative horizontal movement extending laterally of the bag and having a construction that confines the two portions from relative vertical movement and twisting about a horizontal transverse axis when interengaged and adjustable means for securing said mortise and tenon portions from relative horizontal shifting.

References Cited in the file of this patent

UNITED STATES PATENTS

| | | |
|---|---|---|
| 1,978,230 | Schutes | Oct. 23, 1934 |
| 2,223,680 | Fischer | Dec. 3, 1940 |
| 2,327,736 | Pearson | Aug. 24, 1943 |
| 2,575,930 | Schwartz | Nov. 20, 1951 |
| 2,854,244 | Jarman | Sept. 30, 1958 |
| 2,893,676 | Connors | July 7, 1959 |
| 2,945,657 | Jarman | July 19, 1960 |

FOREIGN PATENTS

| | | |
|---|---|---|
| 583,130 | France | Oct. 27, 1924 |
| 407,324 | Great Britain | Mar. 12, 1934 |